United States Patent [19]
Tönsmann et al.

[11] Patent Number: 5,618,127
[45] Date of Patent: Apr. 8, 1997

[54] T-CONNECTOR BETWEEN TWO PROFILES

[75] Inventors: Armin Tönsmann; Siegfried Habicht, both of Leopoldshöhe, Germany

[73] Assignee: Schüco International KG, Bielefeld, Germany

[21] Appl. No.: 205,044

[22] Filed: Mar. 2, 1994

[30] Foreign Application Priority Data

Mar. 2, 1993 [DE] Germany .......................... 43 06 420.5

[51] Int. Cl.⁶ .................................................. F16B 9/00
[52] U.S. Cl. ...................... 403/230; 52/655.1; 52/656.9; 52/665; 403/257; 403/382; 403/403; 403/404; 403/407.1
[58] Field of Search .................. 52/456, 655.1, 52/656.9, 665; 403/23, 179, 187, 205, 230, 256, 257, 261, 286, 382, 403, 404, 405.1, 407.1

[56] References Cited

U.S. PATENT DOCUMENTS

| | | | |
|---|---|---|---|
| 2,377,427 | 6/1945 | Kessler | 403/230 X |
| 3,223,209 | 12/1965 | Skromeda | 403/263 |
| 3,436,887 | 4/1969 | Grossman | 52/665 |
| 3,527,012 | 9/1970 | Hemminger | 52/665 |
| 3,592,493 | 7/1971 | Goose | 52/656.9 |
| 3,994,112 | 11/1976 | Wallace | 52/665 |
| 4,025,209 | 5/1977 | Vollenweider | 403/189 |
| 4,204,375 | 5/1980 | Good | 403/262 X |
| 4,572,694 | 2/1986 | Hoeksema | 403/405.1 X |
| 4,837,997 | 6/1989 | Zeilinger | 52/280 |
| 5,331,727 | 7/1994 | Golen | 52/456 X |
| 5,339,588 | 8/1994 | Ballstadt | 52/656.9 X |
| 5,498,099 | 3/1996 | Scheuer | 403/403 |

FOREIGN PATENT DOCUMENTS 2119246  8/1972  France .......................... 403/230

*Primary Examiner*—Blair Johnson
*Assistant Examiner*—Andrea Chop
*Attorney, Agent, or Firm*—Darby & Darby

[57] ABSTRACT

A T-joint comprises a rung having at least one cavity and a lower face. A frame has a first side facing the rung. The frame has a longitudinal groove disposed in the first side and the groove has a floor and a plurality of upper edges, such that there is a gap disposed between the plurality of upper edges and the floor. The frame has at least one T-joint part that extends into the at least one cavity. The at least one T-joint part is fixedly connected to the groove. The lower face of the rung faces the frame and is disposed adjacent to the upper edges of the groove. At least one sealing cushion is disposed in the gap. The at least one sealing cushion is made from an elastic material and is fixedly connected to the frame such that the gap is sealed by the sealing cushion.

8 Claims, 3 Drawing Sheets

T-CONNECTOR BETWEEN TWO PROFILES

FIELD OF THE INVENTION

The present invention relates to a T-joint between two sections. More specifically, the present invention relates to a T-joint between a rung-type section and a frame-type section, such that the gap between the upper edges of a groove in the frame and the groove floor is sealed.

BACKGROUND OF THE INVENTION

In conventional T-joints it is customary to seal the gap between the lower face of the rung-type section and the frame-type section. Heretofore, this sealing has been accomplished by directly introducing a sealing compound in the gap area, so that the quality and exterior appearance of the seal in the last analysis depends on the care of the workmen, the cleanliness of the section surface, and finally also on the choice of the sealing compound itself.

In addition, since the gap area that is being sealed directly goes over into the cavity area of the rung-type section, the sealing compound, when it is being introduced, can penetrate in an uncontrolled manner into the cavity area of the rung-type section.

The present invention simplifies the seal of the gap area of a T-joint, and reduces the amount of sealing compound needed.

SUMMARY OF THE INVENTION

According to the present invention, at least one sealing cushion is provided to seal the gap. The sealing cushion is designed as a pre-formed part, which is made of an elastic material and is fastened to the frame-type section at its impact area.

By using an appropriately designed sealing cushion, which is fastened to the frame-type section before making the T-joint, one obtains an easily implemented seal which requires neither special skill nor special attention from the workman, since care need only be taken to ensure that the sealing cushion is disposed at the point where the rung-type section contacts the frame-type section. Furthermore, the amount of sealing compound that is required is prescribed by the shape of the sealing cushion and is thus limited to an absolute minimum.

BRIEF DESCRIPTION OF THE PRESENT INVENTION

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein.

DETAILED DESCRIPTION OF THE PRESENT INVENTION

Figure 1A:
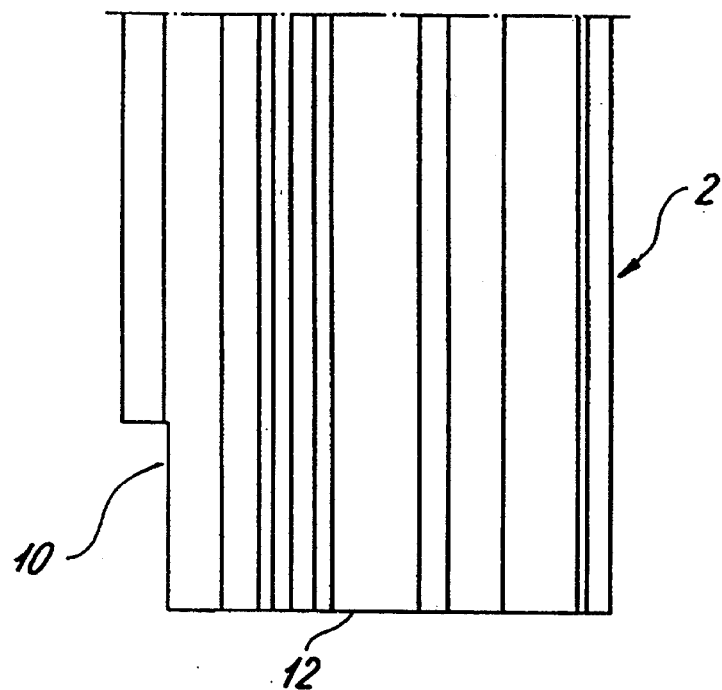
FIGS. 1A and 1B show a sectional view through a frame-type section having a T-joint and a view of a rung-type section that is to be joined together with the frame-type section, in the manner of a T-joint, according to the present invention.
Figure 1B:
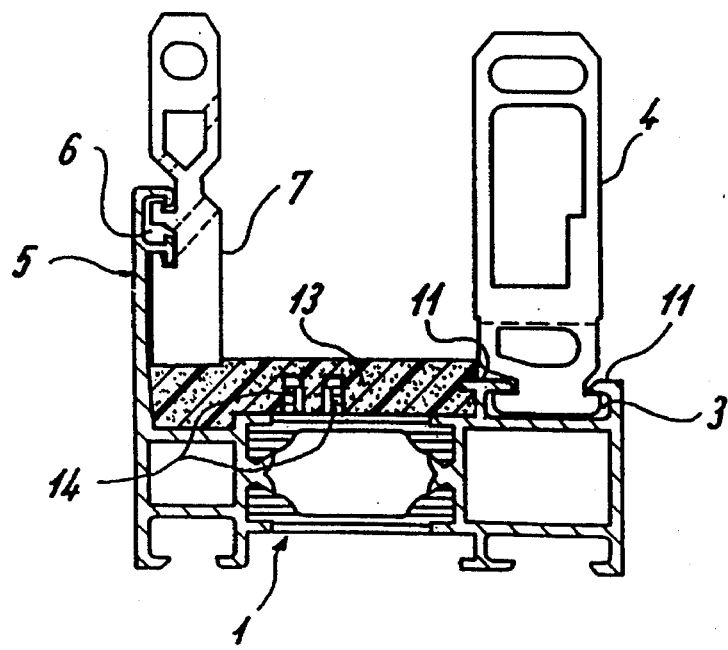

Referring now to FIGS. 1A and 1B, a frame-type section 1, and a rung-type section 2 are illustrated. These sections are joined together in the manner of a T-joint.

In the illustrated embodiment, the frame-type section 1 is designed as a thermally insulated section. Section 1 has a groove 3 on that side which faces the rung-type section 2. Groove 3 extends in the longitudinal direction of the frame-type section 1. A first T-joint part 4 is inserted and fastened in groove 3. The frame-type section 1 also has a pressed-on catch 5, which has a longitudinal groove 6 in the region of its upper edge. Another T-joint part 7 is disposed in this longitudinal groove 6.

Figure 2:
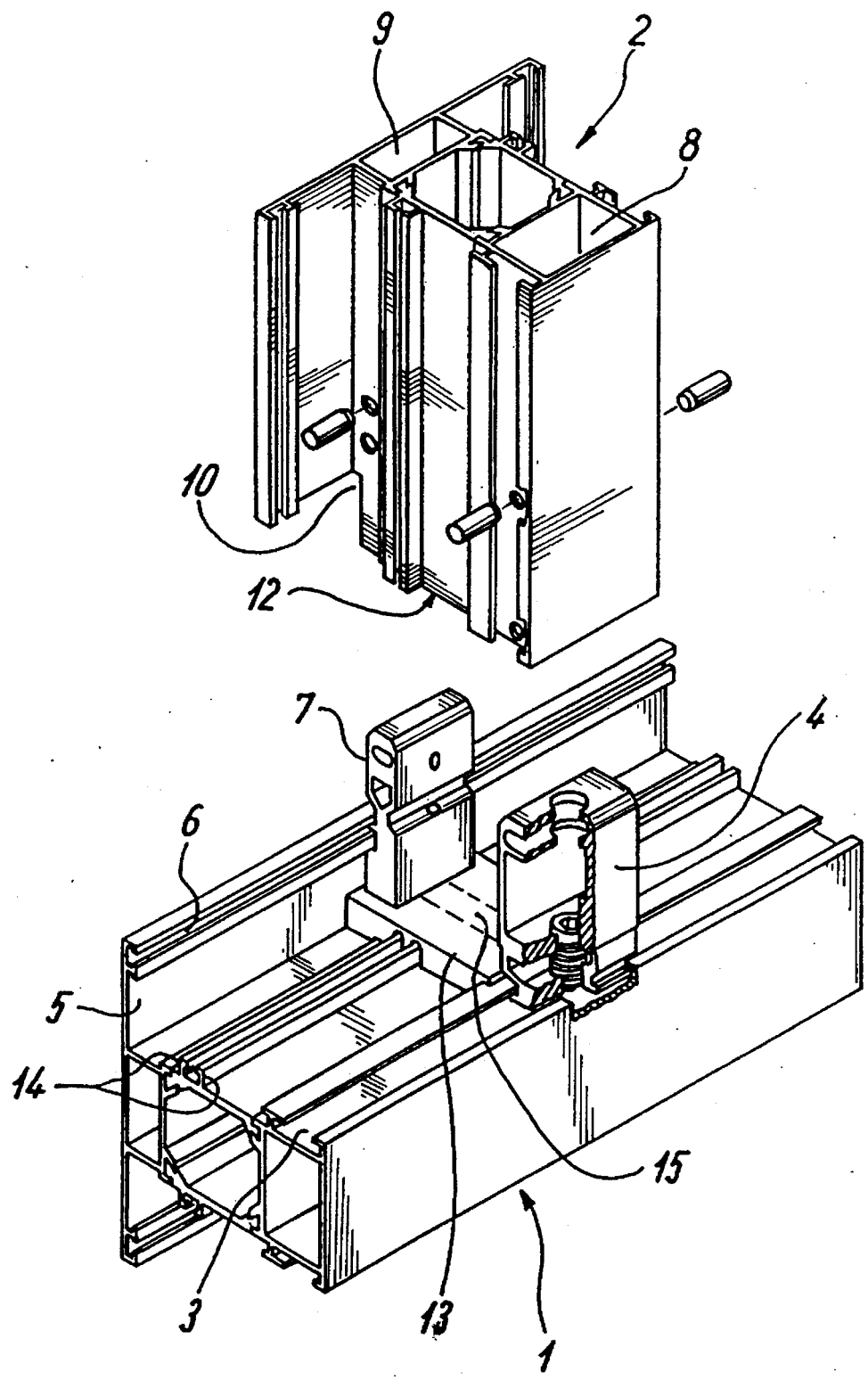
FIG. 2 shows a perspective exploded view of the frame-type section having T-joint parts and of the rung-type section.

As FIG. 2 shows, the rung-type section 2 has cavities 8 and 9. The two T-joint parts 4 and 7 extend into these cavities after the T-joint has been established. The rung-type section 2 also has an appropriately shaped notch 10 in the area of the pressed-on catch 5.

A face 12 of the rung-type section 2 faces the frame-type section 1 and lies on the upper edges 11 of the groove. To seal the gap which remains between the upper edges 11 of the groove and the floor of the groove, a sealing cushion 13, consisting of an elastic pre-formed part, is disposed in the frame-type section 1. In the embodiment shown, a plurality of recesses of the sealing cushion 13 are disposed on the groove webs 14 which protrude or project toward the rung side. Sealing cushion 13 is connected to the base of the groove of the frame-type section 1, for example by a narrow seam of a permanently elastic sealant 15. The thickness of the sealing cushion 13 is somewhat greater than the height of the gap that is being sealed. In this way, the sealing cushion 13 is pressed against the base of the groove of the frame-type section 1 by both the T-joint part 7 and by the lower base 12 of the rung-type section 2, and is thus fixed in its position.

Figure 3:
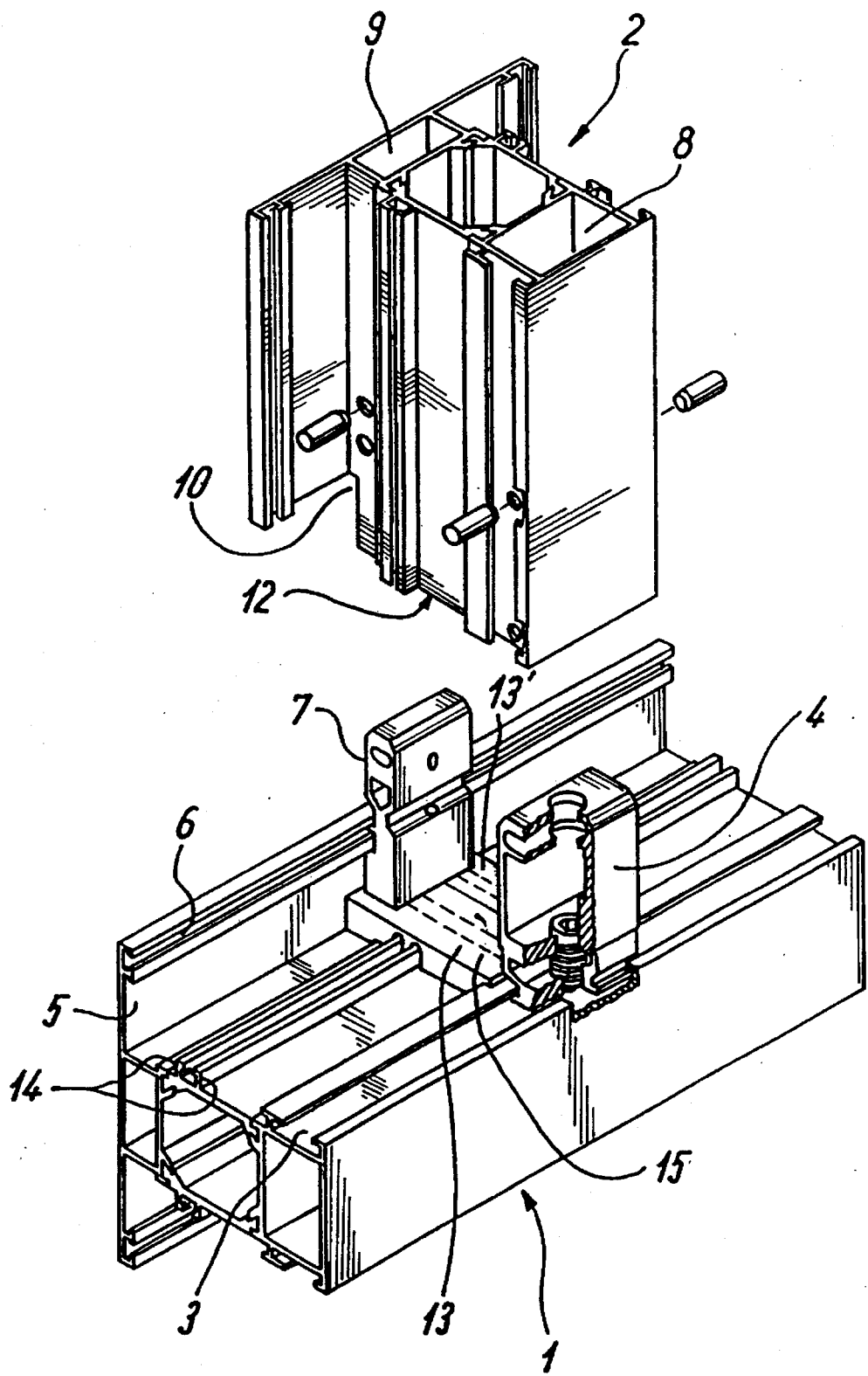
FIG. 3 shows a perspective exploded view of the frame-type section having T-joint parts and of the rung-type section according to another embodiment of the present invention.

If the rung-type sections 2 are relatively narrow, as is shown in the present embodiment, a sealing cushion 13 can be used which covers the entire impact area. If the rung-type sections are relatively wide, a sealing cushion 13 13' can be used in the two edge areas of the rung-type section 2—as viewed in the longitudinal direction of the frame-type section 1—in order to save material (see FIG. 3). However, in every case, it is preferred that the sealing cushion 13 is dimensioned so that it protrudes slightly beyond the edge areas of the rung-type section 2.

The sealing cushion 13 is fixed in its position at the frame-type section 1 by compression, which is due to the T-joint part 7 on the one hand and, on the other hand, due to the rung-type section 2. In addition, the sealing cushion is retained at the frame-type section 1 by the permanently elastic sealant 15.

The sealing cushion 13 is preferably made of a closed-cell foam, to reliably prevent the penetration of moisture into the ante-chamber area of the rung-type section.

From the foregoing description, it will be appreciated that the present invention makes available, a compact, cost efficient sealed. T-joint between a rung section and a frame section.

Having described the presently preferred exemplary embodiment of a new and improved sealed T-joint in accordance with the present invention, it is believed that other modifications, variations and changes will be suggested to those skilled in the art in view of the teachings set forth herein. It is, therefore, to be understood that all such variations, modifications, and changes are believed to fall within the scope of the present invention as defined by the appended claims.

We claim:

1. A T-joint comprising:

a rung having a longitudinal axis, at least one cavity, and a lower face extending transverse to said longitudinal axis;

a frame having a first side facing said rung, said frame having a longitudinal groove disposed in said first side and said groove having a floor and a plurality of upper edges protruding from said floor such that there is a gap disposed between said plurality of upper edges and said floor, said frame having at least one separate T-joint part extending into said at least one cavity, said at least one T-joint part being fixedly connected to said groove, said lower face of said rung faces said floor and is disposed adjacent to said upper edges of said groove such that said gap is further disposed between said lower face and said floor; and:

at least one pre-formed sealing cushion being disposed in said gap; said at least one sealing cushion being made from an elastic material and being fixedly connected to said frame such that said gap is sealed by said sealing cushion.

2. The T-joint of claim 1, wherein said at least one sealing cushion, in the area of its contact with the frame, has at least one recess corresponding to a plurality of groove webs of the frame, said groove webs protruding toward said rung.

3. The T-joint of claim 2, wherein said at least one sealing cushion is fixed to said frame by a narrow seam of a permanently elastic sealant which is applied in the floor of the groove of said frame.

4. The T-joint of claim 2, wherein said at least one sealing cushion is thicker than said gap that is to be sealed, such that said lower face of said rung is pressed into said at least one sealing cushion.

5. The T-joint of claim 4, wherein the frame has a pressed-on catch, to which is affixed one of said T-joint parts, a lower end of said one of said T-joint parts is pressed into said sealing cushion.

6. The T-joint of claim 4, wherein said at least one pre-formed sealing cushion is thicker than said gap at least immediately before disposing said rung adjacent to said upper edges of said groove such that said lower face of said rung compresses said cushion when said rung is disposed adjacent to said upper edges of said groove.

7. The T-joint of claim 1, wherein, at least two sealing cushions are disposed in said gap.

8. The T-joint of claim 1, wherein said sealing cushion is made from a closed-cell foam.

* * * * *